United States Patent [19]

Hempelmann

[11] Patent Number: 4,576,415
[45] Date of Patent: Mar. 18, 1986

[54] WHEEL TRIM RETENTION SYSTEM
[75] Inventor: Heinrich J. Hempelmann, Livonia, Mich.
[73] Assignee: NI Industries, Inc., Novi, Mich.
[21] Appl. No.: 465,222
[22] Filed: Feb. 15, 1983

Related U.S. Application Data
[63] Continuation-in-part of Ser. No. 352,570, Feb. 26, 1982, abandoned.

[51] Int. Cl.⁴ .................................... B60B 7/00
[52] U.S. Cl. .......................... 301/37 S; 301/37 SS
[58] Field of Search ............ 301/37 SS, 37 R, 37 AT, 301/37 S, 37 SC, 37 C, 37 CD, 37 CM, 108 R, 108 S, 108 SC

[56] References Cited

U.S. PATENT DOCUMENTS

| | | | |
|---|---|---|---|
| 1,477,287 | 12/1923 | Sauzedde et al. | |
| 2,107,015 | 2/1938 | Short | 150/54 |
| 2,109,684 | 3/1938 | Short | 150/54 |
| 2,124,035 | 7/1938 | Hurd | 70/169 |
| 2,217,775 | 10/1940 | Smith | 70/168 |
| 2,491,506 | 12/1949 | Lyon | 301/37 |
| 2,526,026 | 10/1950 | Horn | 301/37 CD |
| 2,594,407 | 4/1952 | Earnest | 70/169 |
| 2,725,257 | 11/1955 | Maurer et al. | 301/37 CM |
| 2,800,368 | 7/1957 | Horn | 301/37 CD |
| 2,847,096 | 8/1958 | Lyon | 301/37 SS |
| 2,993,736 | 7/1961 | Lyon | 301/37 CD |
| 3,078,124 | 2/1963 | Mulder | 301/37 SC |
| 3,092,420 | 6/1963 | Baldwin et al. | 301/37 SC |
| 3,170,733 | 2/1965 | Lamme | 301/37 SC |
| 3,268,262 | 8/1966 | Gonas et al. | 301/37 SS |
| 3,549,204 | 12/1970 | Spisak | 301/37 R |
| 3,833,266 | 9/1974 | Lamme | 301/37 AT |
| 4,083,606 | 4/1978 | Scruggs | 301/37 AT |
| 4,217,002 | 8/1980 | Simpson | 301/37 SC |
| 4,268,091 | 5/1981 | Marshall, Jr. | 301/37 R |
| 4,274,679 | 6/1981 | Brinson et al. | 301/37 AT |
| 4,306,751 | 12/1981 | Wegner | 301/37 S X |
| 4,346,940 | 8/1982 | Tatar | 301/37 AT |
| 4,410,217 | 10/1983 | Loren | 301/37 SC |
| 4,447,091 | 5/1984 | Nguyen et al. | 301/37 SC |

FOREIGN PATENT DOCUMENTS 1263040  4/1961  France ............................ 301/37 SC Primary Examiner—Robert B. Reeves
Assistant Examiner—Russell D. Stormer
Attorney, Agent, or Firm—Harness, Dickey & Pierce

[57] ABSTRACT

An improved center retention system for a wheel trim is disclosed which includes an improved anti-rotation assembly for preventing relative rotation of both the wheel trim and the center securing member with respect to the lock bracket secured to the vehicle wheel. In one embodiment, a plurality of trim engaging clips are secured to the lock bracket and a separate spring biased retainer assembly is provided on the trim member to prevent rotation of the center securing fastener. In another embodiment the clips are replaced by a washer element which includes a plurality of arms engageable with the wheel trim to prevent relative rotation between the trim and the lock bracket. Several alternative arrangements for preventing relative rotation of the center securing fastener with respect to the lock bracket are also disclosed.

47 Claims, 59 Drawing Figures

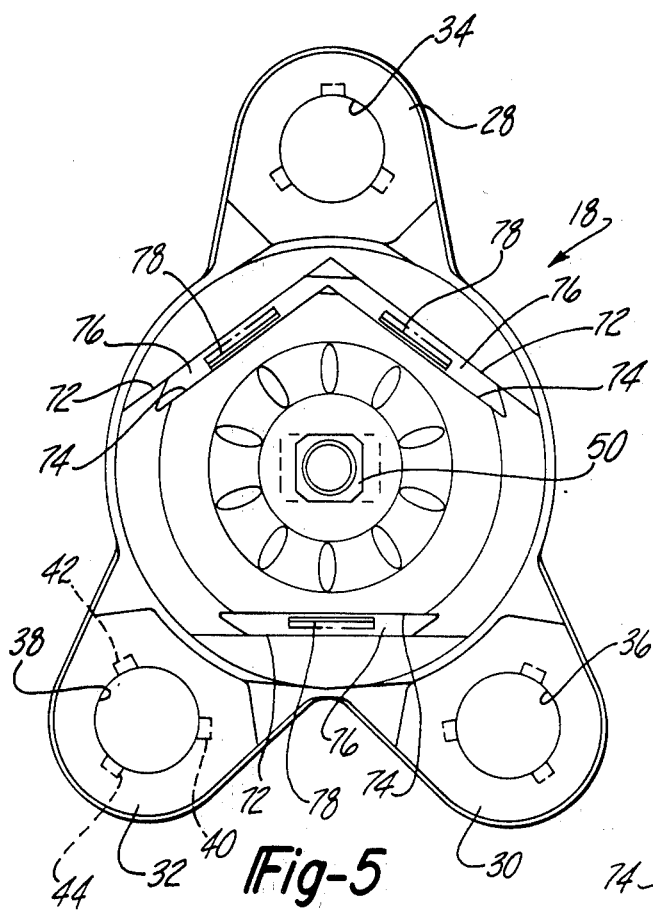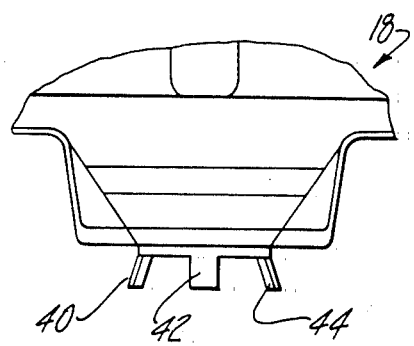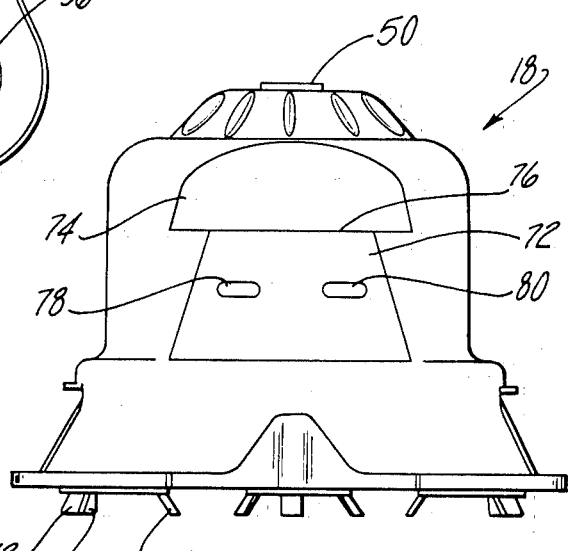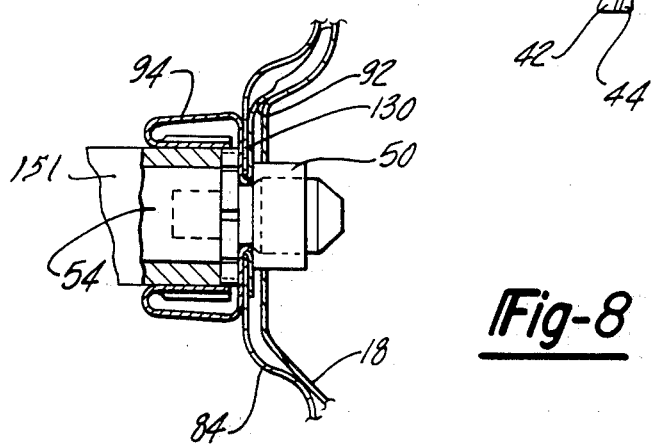

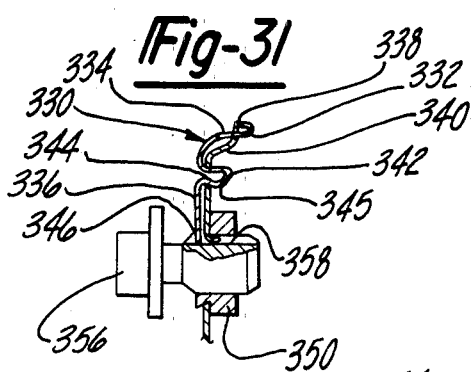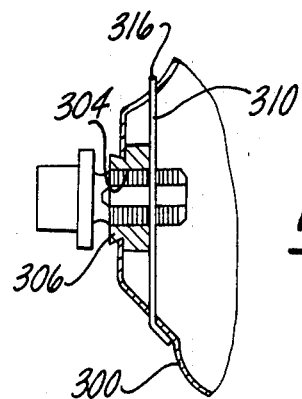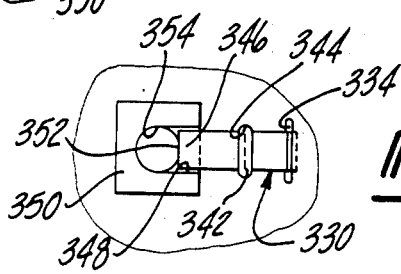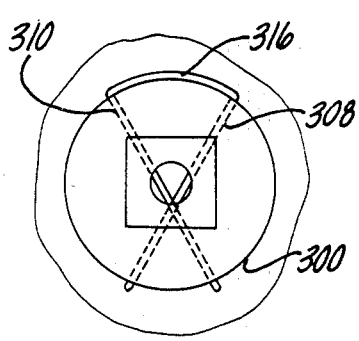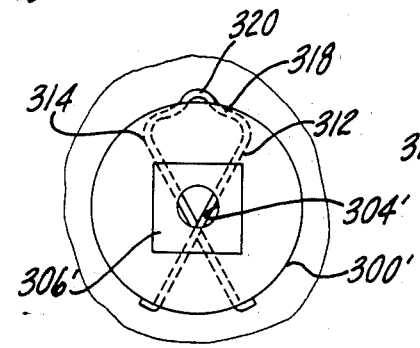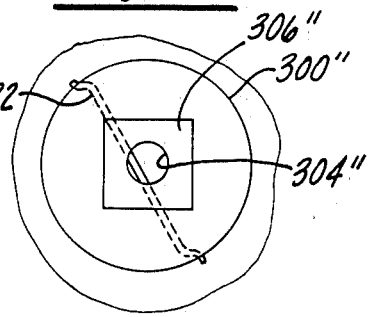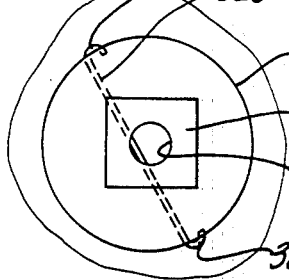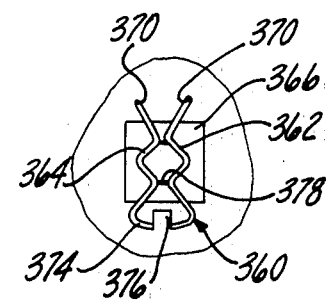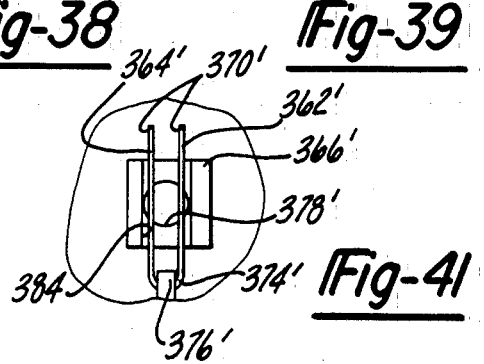

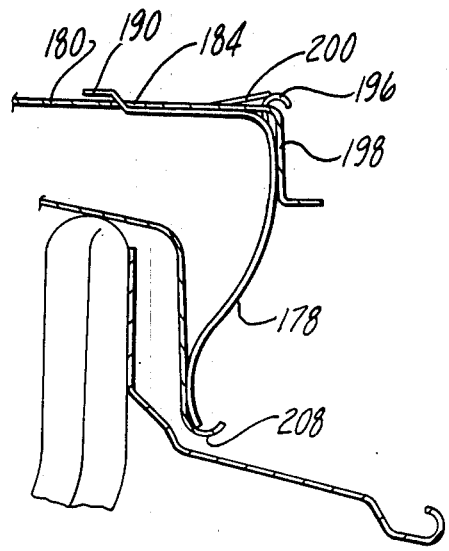
_Fig-42_
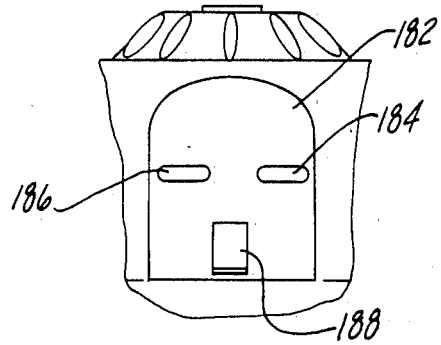
_Fig-43_
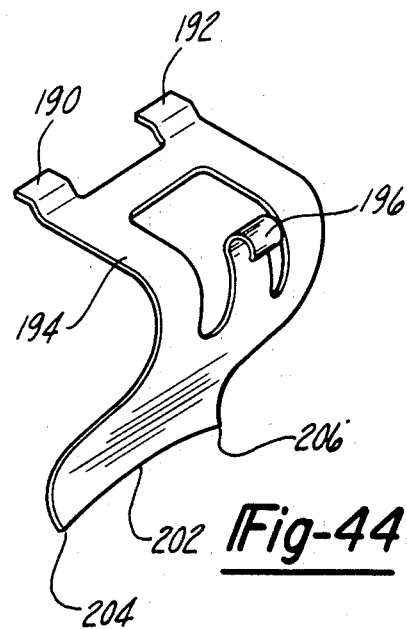
_Fig-44_

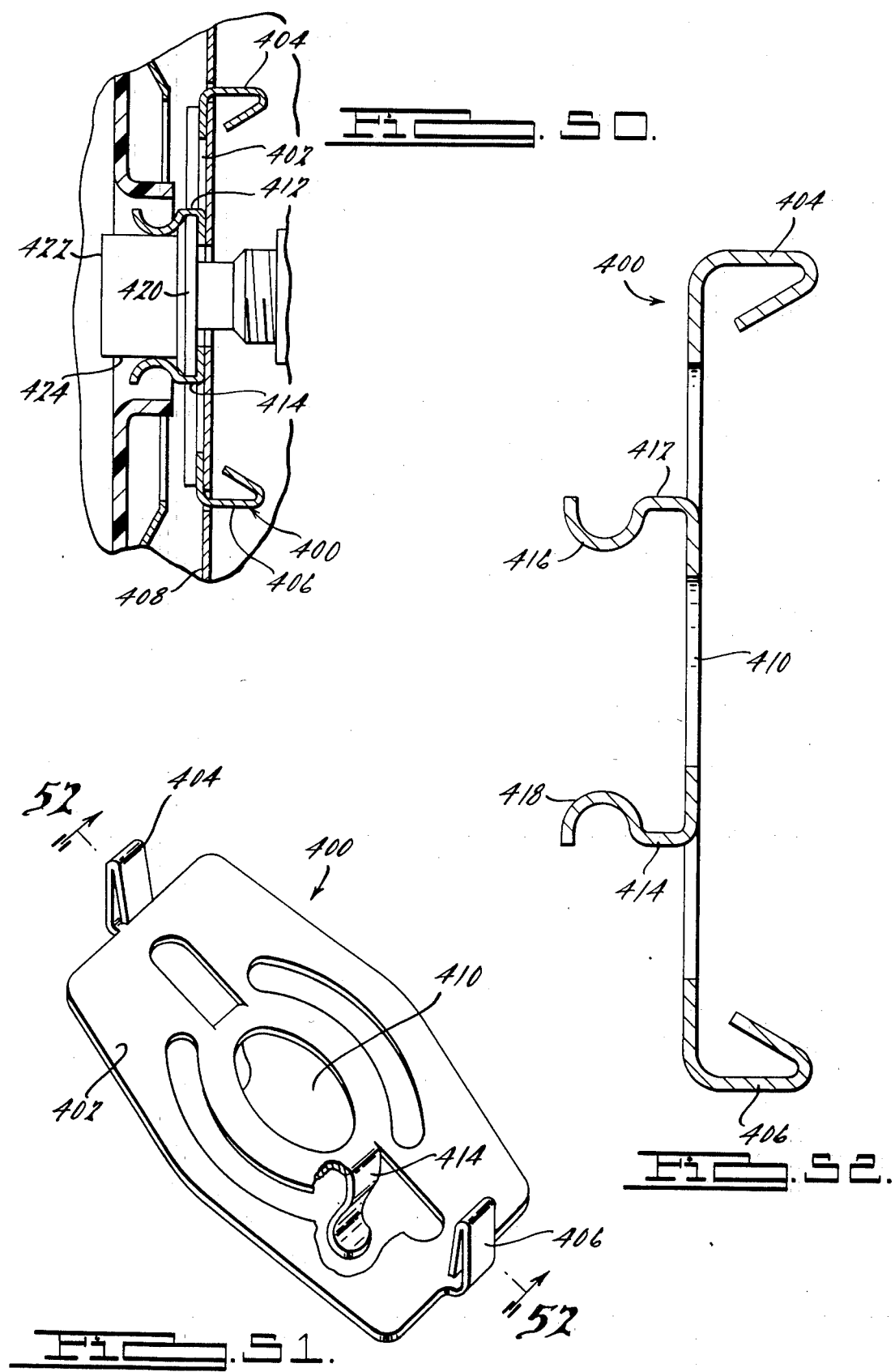

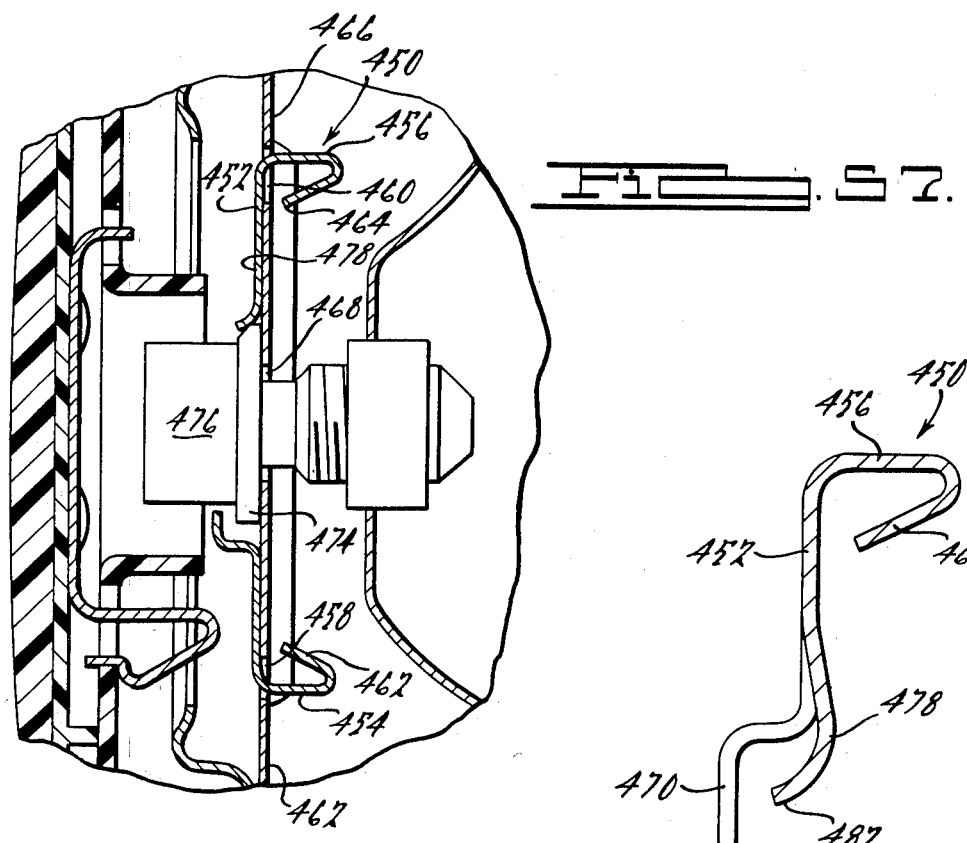
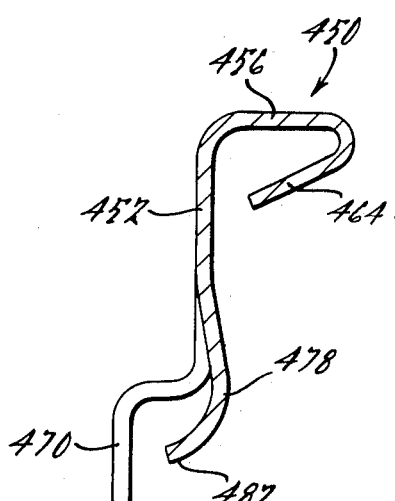
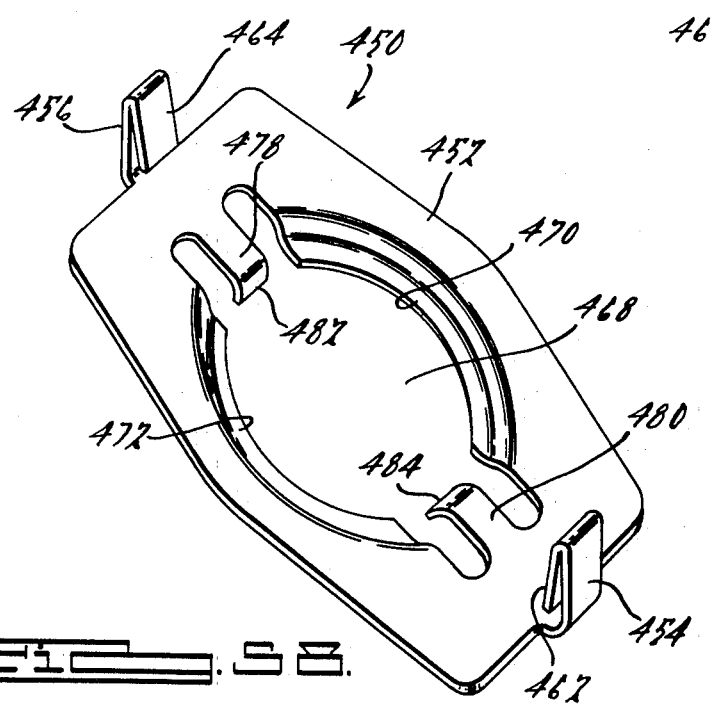

WHEEL TRIM RETENTION SYSTEM

This application of a continuation-in-part of application Ser. No. 352,570, filed Feb. 26, 1982, now abandoned.

BACKGROUND AND SUMMARY OF THE INVENTION

The present invention relates generally to wheel trim and more particularly to center systems for such wheel trim which includes means for preventing relative rotation of the wheel trim with respect to the vehicle wheel.

Numerous types of center retention systems for retaining wheel trim on vehicle wheels have been developed over the years. One common problem encountered with such retention systems is how to prevent relative rotation of the wheel trim with respect to the vehicle wheel. While this may not initially seem to be a difficult problem to overcome, it is compounded by the fact that the valve hole in vehicle wheels is not precisely located with respect to the lug holes but rather varies from wheel to wheel to wheel over a substantial range (on the order of ±20 degrees) thus the anti-rotation system must be adapted to allow the wheel trim to be positioned over a wide range of angular positions with respect to the wheel so as to insure its ability to accommodate the valve stem. Additionally, because the trim member may be subjected to severe inertial torque loading due to sudden and rapid acceleration or deceleration of the vehicle wheel, the anti-rotation system must be capable of withstanding such loading. It is also important to design the anti-rotation system so as to avoid interfering with or complicating the installation and removal of the wheel trim as non-mechanically inclined vehicle operators may be faced with the need to remove and reinstall the trim member such as to change a flat tire. Additionally, because the wheel trim is subjected to often severe vibration and shock loading, it is desirable to incorporate means to prevent the fastener means from loosening.

Further, such center retention systems generally utilize a bracket attached to the axially outwardly facing surface of the vehicle wheel generally by the wheel securing lug nuts. However, the automobile manufacturers are adament that no part of such a bracket may interfere with the engagement of the lug nut with the vehicle wheel. This makes it more difficult to design a bracket which will avoid this interference and yet still be tightly secured to the wheel so as to maintain proper positioning thereof and to avoid generating annoying rattling noise.

The present invention overcomes these problems by providing an improved center retention system which includes anti-rotation means for preventing relative rotation of both the center bolt and the wheel trim with respect to the wheel but yet enables the trim member to be installed on the wheel at substantially any relative angular position. Additionally, the center bolt anti-rotation means is operative to inhibit loss of the wheel trim even in the case where the vehicle operator has failed to properly install the trim member. Further, the center bracket forming a part of the present invention incorporates means engageable with the vehicle wheel which effectively insure a tight rattle-free attachment thereof by means of the lug nuts yet does not interfere with the engagement between the lug nuts and the vehicle wheel. Improved locating and positioning clips for the periphery of the wheel trim are also disclosed which further aid in the installation of the wheel trim.

While the retention system of the present invention may be utilized with most types of wheel trim, it is particularly well suited for use with the very popular simulated wire wheel trim which, because of its high theft rate, is often provided with a center locking means to deter same. Several embodiments of such wheel trim are disclosed in assignee's copending application Ser. No. 347,683, filed Feb. 11, 1982, entitled "Wheel Trim Center Retention System" which is a continuation-in-part of application Ser. No. 15,633, filed Feb. 27, 1979, now abandoned, the disclosures of which are hereby incorporated by reference. The retention system of the present invention is also well suited for use with the floating center simulated wire wheel trim of the type disclosed in assignee's copending application Ser. No. 526,265, now U.S. Pat. No. 4,463,990, entitled "Simulated Wire Wheel Trim and Method", filed Aug. 24, 1981. The retention system of the present invention also offers a significant weight reduction over previous types of retention systems because the relatively heavy retention band and associated retention clips may be eliminated. Weight reduction is an important consideration in the design of today's cars and even more so when the weight eliminated represents unsprung weight of the vehicle. The present invention is also well suited for use in conjunction with the new light alloy and high strength low alloy wheels in which it is either desirable to avoid any biting engagement with the wheel for various reasons such as the possibility of galvanic corrosion or not practical to create such a biting engagement because of the hardness of the wheel. It should also be noted that the present invention may be used in conjunction with existing wheel trim because it requires modification of only the retainer plate and center locking hub.

Additional advantages and features of the present invention will become apparent from the subsequent description and the appended claims taken in conjunction with the accompanying drawings.

BRIEF DESCRIPTION OF THE DRAWINGS

FIG. 5 is an enlarged view of the lock bracket shown in FIG. 1 as seen looking axially inwardly;

FIG. 6 is a view of the lock bracket of FIG. 5 as seen looking radially inwardly;

FIG. 7 is an enlarged fragmentary view of a portion of the lock bracket of FIGS. 5 and 6 showing an opening for receiving the wheel securing stud;

FIG. 8 is an enlarged fragmentary section view of a portion of the wheel trim of FIG. 1 showing the lock bolt anti-rotation retention assembly;

FIG. 31 is a view similar to that of FIG. 25 but showing still another embodiment of a lock bolt retention means;

FIG. 32 is a view of the embodiment of FIG. 31 as seen looking axially inwardly;

FIG. 33 is a view also similar to that of FIG. 25 showing another embodiment of a lock bolt retention means;

FIG. 34 is a view of the clip shown in the embodiment of FIG. 33 as seen looking axially outwardly;

FIGS. 35 through 37 are views similar to FIG. 34 but showing various alternative modifications thereof;

FIG. 38 is a view similar to FIG. 25 but showing another embodiment of a lock bolt retention means;

FIG. 39 is a view of the clip shown in FIG. 38 as seen looking axially inwardly;

FIG. 40 is a view similar to that of FIG. 38 but showing another embodiment of a lock bolt retention means;

FIG. 41 is a view similar to that of FIG. 39 but showing the clip employed in the embodiment of FIG. 40;

FIG. 42 is an enlarged fragmentary section view of an alternative anti-rotation spring clip and associated securing arrangement therefor, all in accordance with the present invention;

FIG. 43 is a fragmentary view of a portion of the lock bracket shown in FIG. 42 as seen looking axially inwardly;

FIG. 44 is a perspective view of the anti-rotation spring clip shown in FIG. 42;

FIG. 50 is a fragmentary section view of the center portion of a simulated wire wheel trim incorporating another embodiment of a lock bolt retention means in accordance with the present invention, the section being taken along a radial plane extending along the axis of rotation;

FIG. 51 is a perspective view of the clip forming a part of the center lock bolt retention means shown in FIG. 50;

FIG. 52 is a section view of the clip shown in FIG. 51, the section being taken along line 52—52 thereof;

FIG. 57 is a view similar to that of FIG. 53 but showing still another embodiment of a center fastener bolt retention means in accordance with the present invention;

FIG. 58 is a perspective view of the clip forming a part of the embodiment shown in FIG. 57; and FIG. 59 is a section view of the clip shown in FIG. 58, the section being taken along line 59—59 thereof.

DESCRIPTION OF THE PREFERRED EMBODIMENTS

Figure 1:
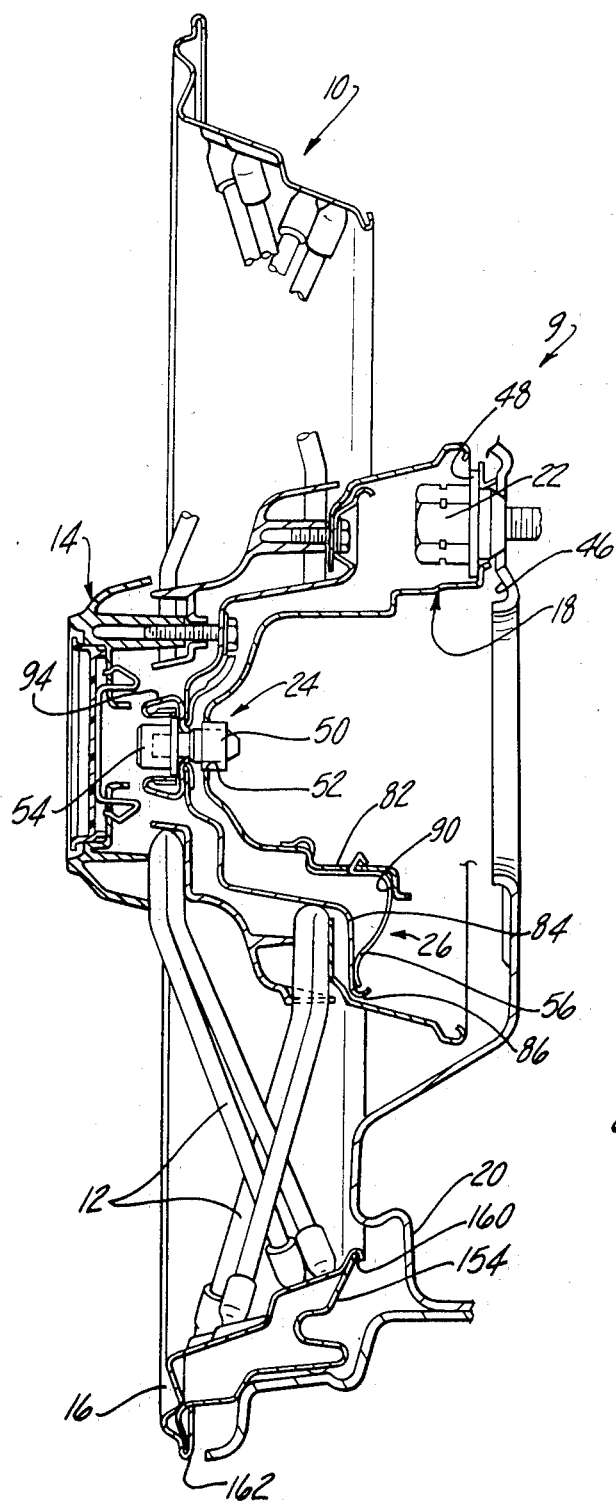
FIG. 1 is a section view of a simulated wire wheel trim shown in installed relationship to a portion of a vehicle wheel and incorporating center retention means in accordance with the present invention, the section being taken along a radial plane extending parallel to the axis of rotation thereof.

Referring now to the drawings and in particular to FIG. 1, there is shown a wheel trim assembly 9 including a wheel trim 10 of the floating center simulated wire wheel type which includes a plurality of spoke members 12 extending between a center hub assembly 14 and an outer annular flange member 16. Wheel trim assembly 9 also includes a center lock bracket 18 secured to an axially outwardly facing surface of a vehicle wheel 20 by lug nuts 22 and retention means 24 operative to enable the wheel trim to be secured to lock bracket 18 and anti-rotation means 26 for preventing relative rotation of the wheel trim with respect to the vehicle wheel.

Lock bracket 18 includes a generally cup-shaped portion having a plurality of radially outwardly extending circumferentially spaced legs 28, 30, 32, each of which is provided with an aperture 34, 36, 38 through which wheel securing studs of the vehicle are received. A plurality of relatively small generally axially inwardly extending tabs 40, 42, 44 are also provided spaced around the periphery of each of the apertures. Each of the tabs 40, 42, 44 is flared radially outwardly slightly with respect to the axis of the aperture and the terminal ends thereof are adapted to engage an axially outwardly facing surface portion 46 of the vehicle wheel so as to aid in positioning and aligning lock-bracket 18 with respect thereto as well as to inhibit relative movement and/or rattle of the lock bracket 18. As shown in FIG. 1, the wheel securing lug nuts 22 are provided with a first conical shoulder engageable with the vehicle wheel to secure same and an annular radially extending flange 48 defining a second shoulder which overlies the axially outer periphery of the aperture and cooperates with tabs 40, 42, 44 to clamp the lock bracket 18 to the vehicle wheel while avoiding any interference between the wheel and lug nut engagement.

Lock bracket 18 also has an internally threaded nut 50 secured within a center opening 52 thereof which is adapted to receive an externally threaded lock bolt 54 associated with the wheel trim to secure the wheel trim to the lock bracket and hence to the vehicle wheel. It should be noted, however, that while as shown the bolt will preferably be associated with the wheel trim 10, it may alternatively be secured to the lock bracket 18 in which case the nut would be associated with the wheel trim 10. Additionally, other types of separable or deteachable elements may be substituted for the threaded fastener combination shown if desired although it will generally be preferable to avoid intricate operating mechanisms due to the adverse environment in which the wheel operates.

Figure 2:
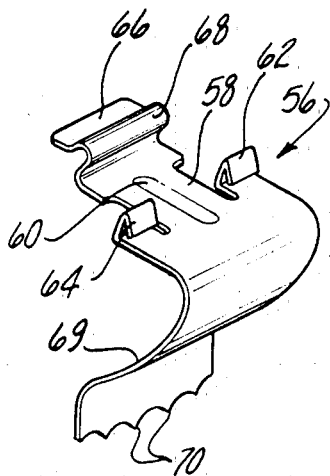
FIG. 2 is an enlarged perspective view of an anti-rotation spring clip forming a part of the center retention means shown in FIG. 1.
Figure 3:
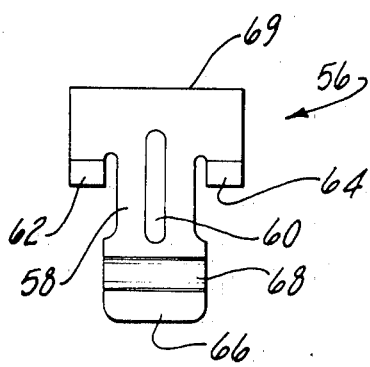
FIGS. 3 and 4 are views of the retention clip of FIG. 2 as seen looking in a radially outwardly direction and an axially outwardly direction respectively.
Figure 4:
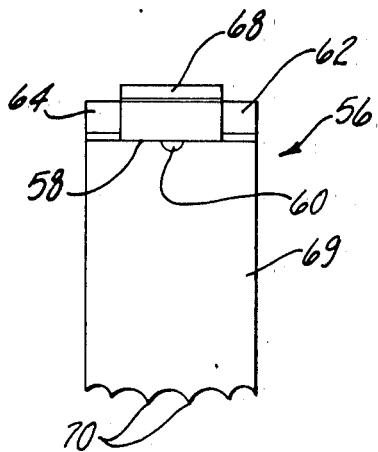

In order to inhibit relative rotation between the lock bracket 18 and wheel trim 10, primary anti-rotation means comprising a plurality of substantially identical anti-rotation spring clips 56 are provided being mounted on the lock bracket in circumferentially spaced relationship. As best seen with reference to FIGS. 2 through 4, each of the spring clips 56 have an irregular shape generally as shown which includes a generally planar main body portion 58 having a stiffening rib 60 provided thereon and a pair of generally V-shaped locking tabs 62, 64 disposed on either side thereof. A relatively planar end portion 66 is offset from the main body portion 58 being connected thereto by a generally arcuate spring section 68 and positioned in generally parallel relationship thereto. The other end 69 has a generally S-shaped arcuate contour designed to extend generally radially outwardly from the lock bracket 18 with the terminal end being provided with a plurality of teeth 70.

In order to accommodate anti-rotation spring clips 56, the lock bracket 18 is provided with a plurality of circumferentially spaced substantially identical mounting means. Each of the mounting means comprise axially inner and outer radially offset axially extending flats 72 and 74 with a generally radially extending axially outwardly facing flat or shoulder 76 extending therebetween. A laterally extending slot 78 is provided (preferably by lancing) at approximately or adjacent either side of the juncture of the axially outer flat 74 and shoulder 76, which slot is sized to accommodate end portion 66 of the anti-rotation spring clip 56. Additionally, a pair of circumferentially or laterally spaced and circumferentially extending slots 79 and 80 are also provided (preferably by lancing) in the axially inner flat 72 which are positioned and sized to receive respectively V-shaped tabs 62, 64. As best seen with reference to FIG. 1, spring clips 56 may be easily assembled to lock bracket 18 by first inserting end portion 66 in slot 78 and thereafter pivoting clip 56 axially and radially inwardly to bring respective tab portions 62 and 64 into alignment with slots 79 and 80. The end of each of tabs 62 and 64 will be resiliently deformed slightly as they are inserted through slots 79 and 80 and will snap into engagement with the inner surface 82 of the lock bracket 18 so as to provide a mechanical interlock retaining the anti-rotation clip in assembled relationship thereto. It should be noted that in order to insure that clips 56 do not interfere with access to the wheel securing lug nuts, flats 72 and 74 have been positioned substantially diametrically opposite respective legs 28, 30 and 32.

Figure 24:
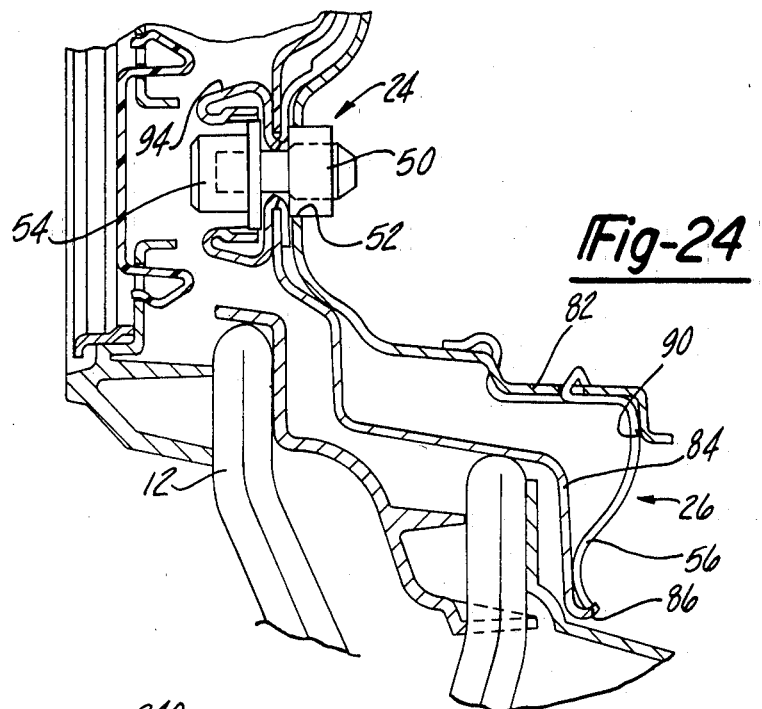
FIG. 24 is a fragmentary section view of a portion of the wheel trim shown in FIG. 1 with the lock bolt being fully tightened.

As best seen with reference to FIGS. 1 and 24, the wheel trim 10 is provided with a generally cup-shaped retainer plate 84 having an annular generally C-shaped axially inwardly extending inner lip 86. As wheel trim 10 is assembled to lock bracket 18, arcuate first portion 69 of clip 56 will initially engage radially extending flange portion of retainer plate 84. As lock bolt 54 is then tightened drawing wheel trim 10 and associated retainer plate 84 axially inwardly, flange portion will deflect arcuate portion axially inwardly thereby effecting a radially outwardly movement of teeth 70 into a biting engagement with lip 86. Lip 86 will preferably be provided with a plurality of generally axially extending ribs or undulations in order to increase the effective anti-rotation engagement with teeth 70. The force of engagement between teeth 70 of clip 56 and lip 86 is aided by the cooperative effect resulting from the engagement of the arcuate portion 69 of clip 56 with radially extending flange portion of retainer plate 84 and the engagement of main body 58 of clip 56 with an axially inner and outwardly facing shoulder 90 on lock bracket 18. It should also be noted that this forceful engagement and the substantial width of anti-rotation clip 56 also cooperate to retain the clip in a fully seated engagement with the axially inner flat 72 and thereby assist in inhibiting relative rotation between the wheel trim 10 and the lock bracket 18.

In addition to providing means for preventing relative rotation between the lock bracket and wheel trim, the present invention also incorporates secondary anti-rotation means which comprises a lock bolt anti-rotation retainer assembly. As best seen with reference to FIG. 8, lock bolt anti-rotation assembly comprises axially inner and outer members 92 and 94 which cooperate with the lock bracket 18 and lock bolt 54 respectively to prevent relative rotation therebetween.

Figure 9:
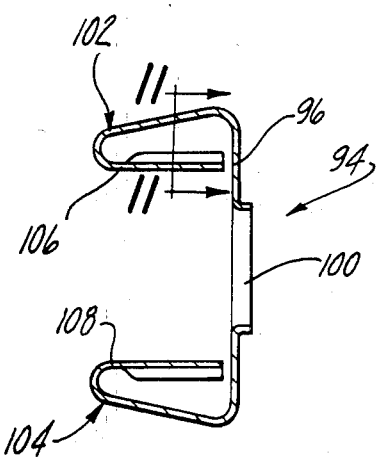
FIG. 9 is a section view of the upper lock bolt retainer clip forming a part of the lock bolt anti-rotation assembly of FIG. 8, the section being taken along line 9—9 of FIG. 10.
Figure 10:
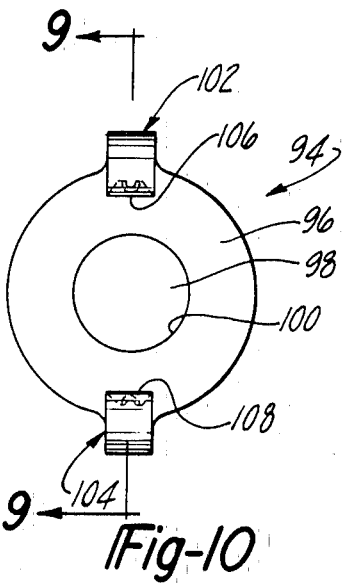
FIG. 10 is a plan view of the retainer clip shown in FIG. 8 as seen looking axially inwardly.
Figure 11:
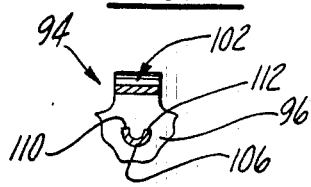
FIG. 11 is a fragmentary section view of the retainer clip of FIG. 9, the section being taken along line 11—11 thereof.
Figure 12:
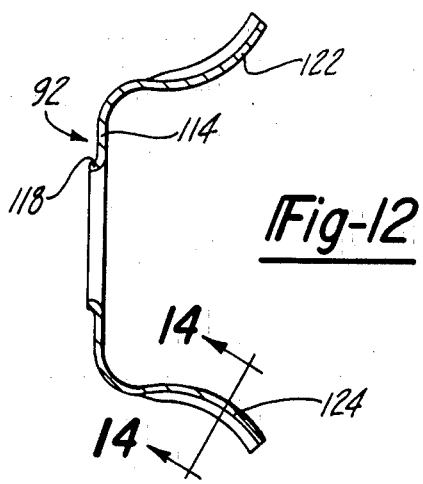
FIG. 12 is a section view of the lower lock bolt retainer clip shown in FIG. 8, the section being taken generally along the line 12—12 of FIG. 13.
Figure 13:
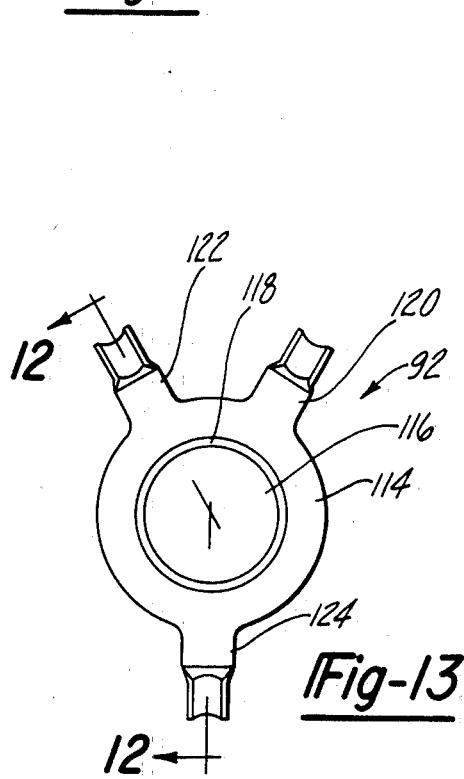
FIG. 13 is a view of the lower lock bolt retainer clip shown in FIG. 12 as seen looking axially inwardly.
Figure 14:
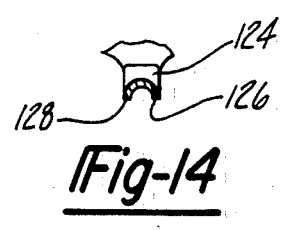
FIG. 14 is a fragmentary section view of the lower lock bolt retainer shown in FIGS. 12 and 13, the section being taken along line 14—14 of FIG. 12.

Referring now to FIGS. 9-11, outer lock bolt retainer member 94 includes a generally circular body portion 96 having a central opening 98 defined by a generally axially inwardly extending annular cylindrical flange portion 100. A pair of substantially identical arms 102 and 104 project axially outwardly from the periphery of member 94 being positioned in generally diametrically opposed relationship and each includes a return portion 106, 108 extending generally axially inwardly toward the body portion and terminating in closely spaced proximity thereto. The lateral edges 110, 112 of the return portions are deformed radially outwardly so as to impart a generally semi-circular or arcuate cross-sectional contour thereto.

The inner lock bolt retainer member 92 also has a generally circular body portion 114 with a central opening 116 therein defined by an annular generally axially outwardly extending flange portion 118. A plurality of legs 120, 122, 124 project generally radially outwardly and axially inwardly from body portion 114 being positioned in circumferentially spaced relationship to each other. Each of legs 120, 122, 124 is substantially identical being slightly radially inwardly bowed and having the opposite lateral edges 126, 128 thereof deformed radially outwardly so as to define a generally semi-circular cross-sectional contour.

Figure 15:
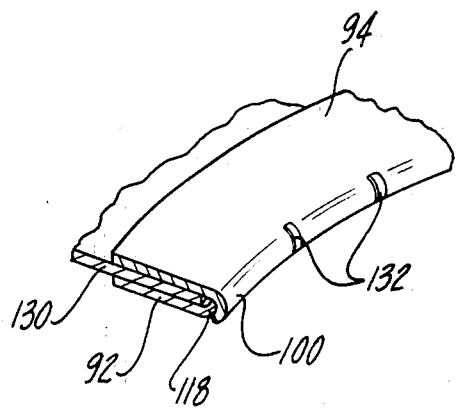
FIG. 15 is a fragmentary perspective view of a portion of the inner and outer lock bolt retainer clips showing a method of joining the clips together with the wheel trim retainer plate disposed therebetween.
Figure 16:
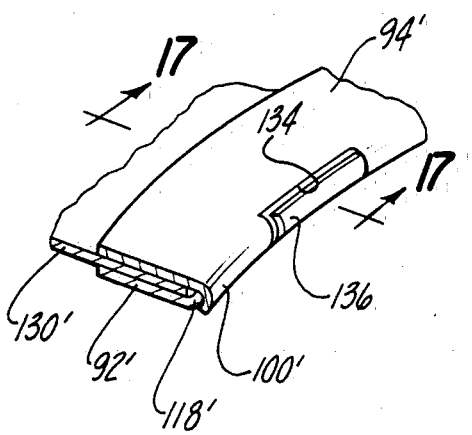
FIG. 16 is a view similar to that of FIG. 15 but showing an alternative manner of securing the inner and outer lock bolt retainer clips together.
Figure 17:
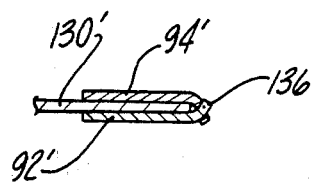
FIG. 17 is a section view of the assembly shown in FIG. 16, the section being taken along line 17—17 thereof.
Figure 18:
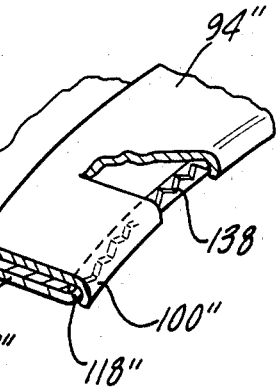
FIG. 18 is a view also similar to that of FIGS. 15 and 16 but showing a further alternative manner of securing the inner and outer clips together with a portion thereof broken away.
Figure 19:
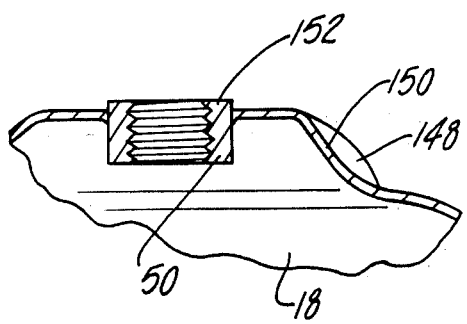
FIG. 19 is an enlarged fragmentary view of a portion of the lock bracket of FIGS. 5 and 6, the lock bracket being shown in section.

As shown in FIGS. 8 and 15, inner and outer members 92, 94 are designed to be secured together with respective flange portions 100, 118 being folded, crimped, rolled or otherwise deformed over each other with a generally radially extending flange portion 130 of retainer plate 84 being trapped therebetween. In order to prevent relative rotational movement between inner and outer members 92, 94 various arrangements may be incorporated therein to interlock or create a biting relationship therebetween. For example, as shown in FIG. 15, a plurality of relatively narrow slots 132 may be provided in the flange portion 100 of outer member 94 which will provide edges to bitingly engage the edge of flange portion 118 of inner member 92. Alternatively, as shown in FIGS. 16 and 17, the flange portion 100' of outer member 94' may be provided with a plurality of circumferentially extending and spaced cutouts 134. The flange portion 118' of the inner member 92' may then be slit so as to allow portions 136 thereof to be received within the cutouts 134 thereby creating a mechanical interlock between the overlapping flange portions. FIG. 18 illustrates yet another variation in which the edge of flange portion 118" of the inner member 92" is provided with a plurality of teeth 138 which bitingly engage the overlapping flange portion 100" of the outer member 94".

Figure 20:
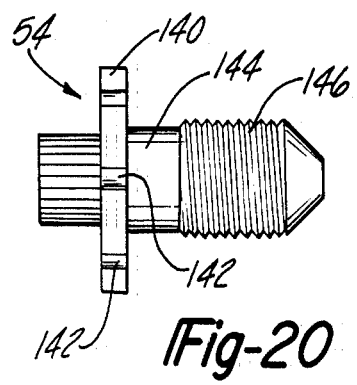
FIG. 20 is an elevational view of a lock bolt for use in conjunction with the present invention.
Figure 21:
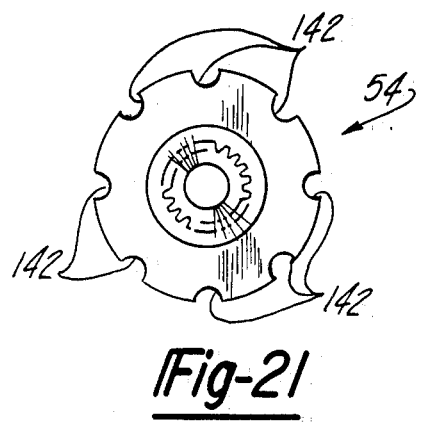
FIG. 21 is another view of the lock bolt of FIG. 20 as seen looking axially inwardly.

As shown in FIGS. 20 and 21, lock bolt 54 has an annular radially extending flange 140 provided thereof intermediate the ends thereof which is provided with a plurality of axially extending circumferentially spaced notches 142. Additionally, a reduced diameter neck portion 144 is provided between flange portion 140 and the threaded portion 146 of the shank. Also, lock bracket 18 has a plurality of axially inwardly projecting generally radially elongated depressions 148 provided on a generally conical or slightly arcuate surface portion 150 thereof surrounding in circumferentially spaced relationship, lock nut 50. When wheel trim 10 is installed on a vehicle wheel 20 to which the lock bracket 18 has already been attached, legs 120, 122, 124 of inner member 92 will engage the arcuate surface portion 150 and/or depressions 148 provided on lock bracket 18. Thereafter, lock bolt 54 is moved into threaded engagement by means of a socket type wrench or torque tool 151, the sidewalls of which will bias return portions 106, 108 of arms 102, 104 radially outwardly out of engagement with flange portion 140 of lock bolt 54. Preferably, torque tool 151 will be similar to that disclosed in copending application Ser. No. 15,633 and lock bolt 54 will have a discontinuous groove as disclosed therein cooperable with torque tool 151. As lock bolt 54 is tightened upon initial installation of wheel trim 10, flange portion 140 of the lock bolt 54 will draw the retainer assembly (including overlapping flange portions 100 and 118) and flange portion 130 of retainer plate 84 axially inwardly and actually compress the inner and outer members 92, 94 together against the axially outwardly facing surface 152 of lock nut 50. This compressive action will complete the deformation of flanges 100, 118 thereby resulting in a slight decrease in the diameter of the opening through which lock bolt 54 was inserted which, because of the reduced diameter neck portion 144, will operate to trap lock bolt 54 therein thus preventing separation of the lock bolt from the wheel trim and possible loss thereof upon subsequent removal of the wheel trim. As torque tool 151 is removed from the head of lock bolt 54, return portions 106, 108 of arms 102, 104 will spring back into engagement with the peripheral flange 140 of lock bolt 54 and may or may not engage one of the notches 142 provided on the periphery thereof. However, in any event, only slight rotational movement of lock bolt 54 will cause return portions 106, 108 of arms 102, 104 to move into respective of notches 142 provided on flange 140 which will thereafter prevent further relative rotational movement of lock bolt 54 with respect to the lock bolt retainer assembly. Further, the legs 120, 122, 124 on inner portion 92 will also cooperate with the depressions 148 on lock bracket 18 to prevent relative rotation of retainer assembly with respect thereto and thus prevent loosening of the lock bolt 54. This arrangement is particularly desirable because the anti-rotation retainer assembly will operate to prevent the lock bolt from backing out of nut 50 due to vibration or the like even when it is not fully tightened therein.

Figure 22:
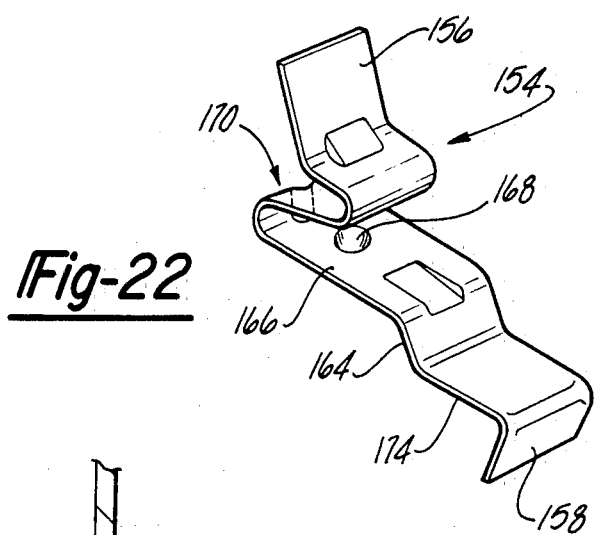
FIG. 22 is an enlarged perspective view of a centering clip provided on the wheel trim of FIG. 1.
Figure 23:
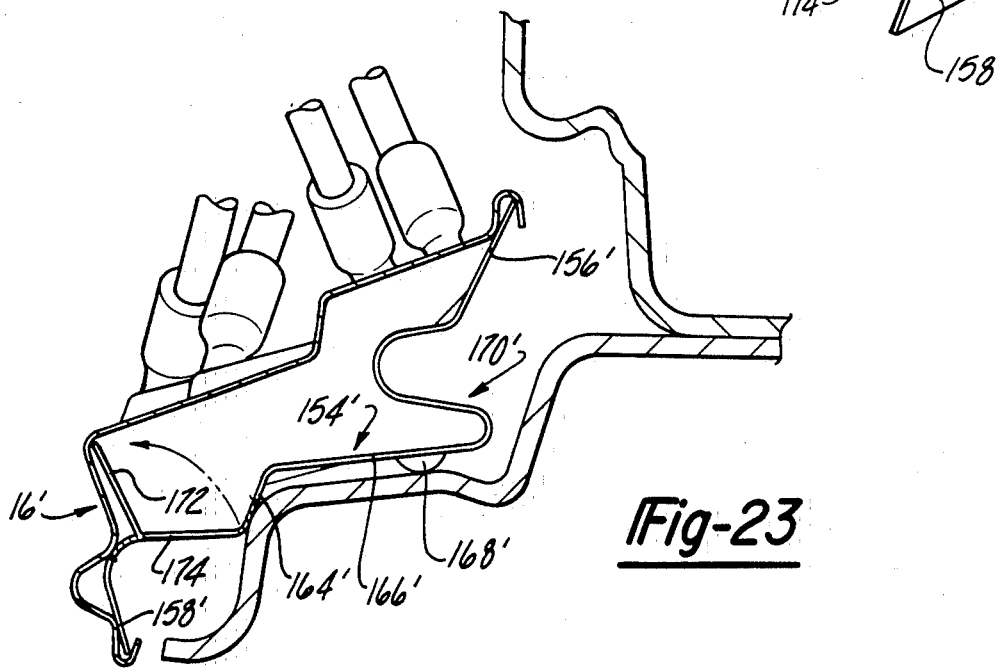
FIG. 23 is an enlarged fragmentary section view of a portion of the wheel trim of FIG. 1 with another embodiment of a centering clip shown assembled thereto.

The wheel trim is also provided with a plurality of substantially identical irregularly shaped centering springs 154. As shown in FIG. 22, spring clip 154 has opposite end portions 156, 158 which both project slightly axially inwardly and in generally opposite radial directions, each being received in a generally U-shaped lip or edge portion 160, 162 respectively of the outer spoke retainer flange 16. A generally radially extending flange portion 164 is provided which is designed to abut an axially facing shoulder on the vehicle wheel in order to axially position the wheel trim with respect thereto. A generally axially extending flange 166 projects axially inwardly from the radially inner end of flange 164 and includes a protrusion 168 thereon engageable with the axially extending flange portion of the vehicle wheel to aid in centering of the wheel trim with respect thereto. Flange portion 166 is biased generally radially outwardly by a generally S-shaped spring portion 170 provided between end portion 156 and the axially extending flange portion 166. Preferably, spring portion 170 will be slightly compressed when spring 154 is assembled to wheel trim 10 so as to bias end portions 156, 158 thereof into respective U-shaped lip portions 160, 162 of flange 16. It should be noted that this arrangement enables spring clips 154 to be assembled to flange 16 after it has been fully formed thereby eliminating the need to perform any subsequent crimping, rolling, spinning, or other forming operation thereon. As shown in FIG. 23, an optional tab portion 172 may be lanced out of a generally axially extending flange portion 174 and deformed radially inwardly to further aid in securing the spring clip 154 to the wheel trim 10.

While the lock bolt retainer assembly described above is well suited for its intended purpose, a number of alternative lock bolt retainer assemblies all in accordance with the present invention are illustrated and will be described with reference to FIGS. 25 through 41.

Figures 25, 26:
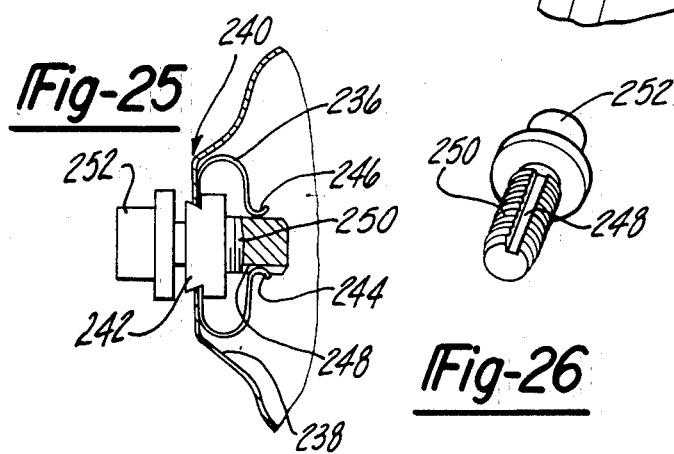
FIG. 25 is a fragmentary section view of a portion of the lock bracket showing another embodiment of lock bolt retention means in accordance with the present invention.
FIG. 26 is a perspective view of the lock bolt shown in FIG. 25.

In the embodiment of FIG. 25, a generally C-shaped spring clip 236 is provided which is secured to the axially inner surface 238 of lock bracket 240 through the agency of nut 242 which has a portion extending through a square or non-circular opening in spring clip 236 and lock bracket 240 to thereby prevent relative rotation therebetween. The opposite ends 244, 246 of spring clip 236 are generally arcuately contoured and positioned in closely spaced relationship and are operative to engage one or more axially extending flats 248 provided on the shank portion 250 of lock bolt 252 as it threads through nut 242. The engagement of either or both ends 244, 246 of spring clip 236 with flats 248 will operate to effectively inhibit relative rotation of lock bolt 252 with respect thereto and hence with respect to lock bracket 240. However, as lock bolt is tightened by means of a wrench during installation of the wheel trim, ends 244 and 246 will spring radially outwardly as flat 248 is rotated past them. It should be noted that, if desired, a single leg may be provided on spring clip 236.

Figure 28:
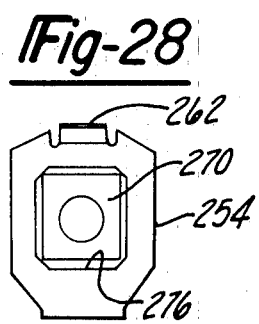
FIG. 28 is a view of the clip shown in FIG. 27 as seen looking axially inwardly.
Figures 27, 29:
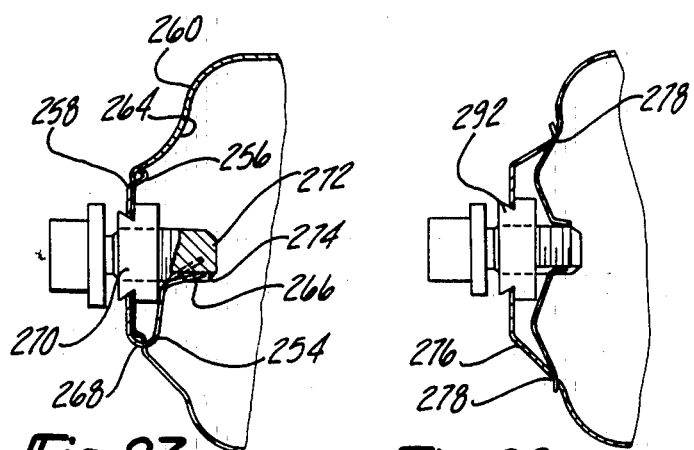
FIG. 27 is a view similar to that of FIG. 25 but showing another embodiment of a lock bolt retention means.
FIG. 29 is a view similar to FIGS. 25 and 27 but showing another embodiment of a lock bolt retention means.

A generally U-shaped spring clip 254 is provided in the embodiment of FIGS. 27 and 28 which has a generally V-shaped tab 256 at one end thereof which extends through an opening 258 in lock bracket 260, the terminal edge 262 thereof engaging the inner surface 264 of lock bracket 260 to mechanically lock tab 256 therein. The other end 266 extends through another opening 268 in lock bracket 260 and overlies the opening in nut 270 through which lock bolt 272 extends and is adapted to engage one or more axially extending flats 274 on lock bolt 272 so as to inhibit relative rotation thereof in a manner similar to that described with reference to the embodiment of FIG. 25. A generally square shaped opening 276 is provided in the axially outer portion of spring clip 254 to accommodate the axially outwardly projecting portion of nut 270.

Figure 30:
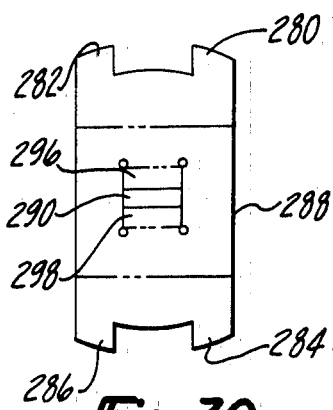
FIG. 30 is a view of the retention clip shown in FIG. 29 as seen looking axially outwardly.
Figure 45:
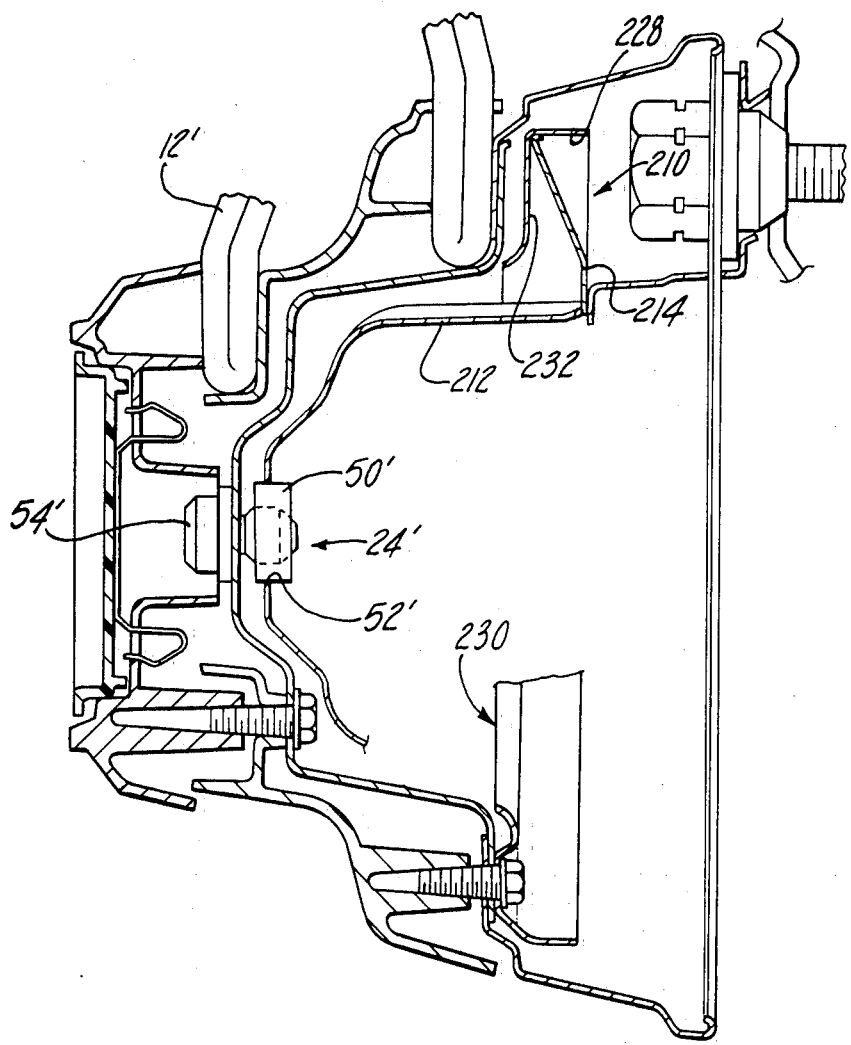
FIG. 45 is a fragmentary section view of the center portion of a simulated wire wheel trim incorporating another embodiment of a center retention system in accordance with the present invention, the section being taken along a radial plane extending along the axis of rotation thereof.

In the embodiment of FIGS. 29 and 30, lock bracket 276 is provided with a plurality of slots 278 each of which are adapted to receive one of four tab portions 280, 282, 284, 286 provided on spring clip 288. Clip 288 has a central non-circular opening 290 positioned to overlie the opening in nut 292 through which lock bolt 294 extends and into which a pair of spring tabs 296, 298 project from opposite sides. Spring tabs 292, 294 are designed to engage flats provided on lock bolt 294 so as to inhibit relative rotation thereof in substantially the same manner as described with reference to the embodiment of FIG. 25.

Referring now to FIGS. 31 and 32, another lock bolt retainer assembly embodiment is illustrated which comprises an irregularly shaped spring clip 330 having a generally V-shaped first end portion 332 which is received in an opening 334 in lock bracket 336, the terminal edge 338 thereof being engageable with the inner surface 340 of lock bracket 336 to create a mechanical interlock. A central generally U-shaped spring portion 342 of clip 330 is received in another opening 344 provided in lock bracket 336 and includes a transverse rib portion 345 to aid in retention thereof. The other end of spring clip 330 comprises a blade portion 346 which is radially movably received within a slot 348 provided in the axially outer surface of nut 350, the terminal edge 352 thereof being positioned so as to extend slightly into the lock bolt receiving opening 354 provided in nut 350. Thus, as lock bolt 356 is rotated causing flat 358 provided thereon to move into and out of engagement with edge 352, blade portion 346 will reciprocate in slot 348. However, once tightened, the spring portion 342 will bias edge 352 of blade portion into engagement with flat 358 of lock bolt 356 so as to inhibit relative rotation thereof with respect to lock bracket 336.

In the embodiments of FIGS. 33 through 37, lock bracket 300 is provided with suitable openings within which a spring wire is supported, which spring wire extends across the opening 304 in nut 306 offset from the center thereof. In FIGS. 34 and 35, a pair of spring wire legs 308, 310 and 312, 314 respectively extend across the opening, legs 308, 310 being interconnected by a segment 316 extending across the outer surface of lock bracket 300 and legs 312, 314 being interconnected by a segment 318 extending across the inner surface of lock bracket 300' which has a portion 320 extending through a slot provided therein. In FIG. 36, a single length of spring wire 322 extends across opening 304" in nut 306" in off center relationship thereto with opposite ends thereof being supported in suitable openings in lock bracket 300". FIG. 37 shows a similar embodiment to that of FIG. 36 but opposite ends 324 and 326 of spring wire 328 are folded or otherwise deformed over the outer surface of lock bracket 300'''.

In FIGS. 38 and 39, a spring wire clip 360 is provided having a pair of legs 362, 364 extending across the axially outer surface of nut 366 the ends of which are received within respective openings 368, 370 in lock bracket 372. An interconnecting portion 374 of clip 360 is secured to lock bracket 372 on the opposite side of nut 366 by a suitable tab portion 376. As best seen with reference to FIG. 39, portions of respective legs 362, 364 are formed so as to encroach slightly into overlying relationship with respect to opening 378 in nut 366 so as to be engageable with suitable flats 380 provided on lock bolt 382 so as to thereby inhibit relative rotation thereof with respect to lock bracket 372.

Another embodiment is also shown in FIGS. 40 and 41 which is very similar to that shown in FIGS. 38 and 39 and accordingly corresponding portions thereof are indicated by like numbers primed. In this embodiment, however, legs 362' and 364' are straight and extend in substantially parallel relationship through a slot 384 provided in the axially outer surface of nut 366'. The operation of this embodiment is otherwise substantially the same as that described.

An alternative embodiment of a wheel trim anti-rotation clip 178 and associated mounting means therefore provided on lock bracket 180 is shown in FIGS. 42 through 44. As shown therein, lock bracket 180 has a plurality of substantially identical flats 182 spaced circumferentially therearound similarly to that described with reference to lock bracket 18. Each of the flats 182 has a pair of laterally or circumferentially spaced and extending slots 184, 186 and a single circumferentially extending slot 188 centered therebetween and spaced axially inwardly therefrom.

Spring clip 178 includes a pair of arms 190, 192 extending axially outwardly from and radially offset from a main body portion 194 thereof. Arms 190, 192 are adapted to be received in respective slots 184, 186. A center hook portion 196 is lanced, punched, or otherwise formed out of the center part of the main body portion 194 and is designed to be inserted through lower slot 188 on lock bracket 180 and to hook over radially extending flange portion 198 thereof so as to securely retain spring clip 178 thereon. As shown tab portion 200, which in part defines this lower slot 188, may also assist in retaining hook portion 196 in proper engagement with flange portion 198. In place of the multi-toothed outer edge of clip 56, clip 178 has a generally arcuate radially outer edge 202 which defines a pair of teeth 204, 206 at opposite lateral edges thereof. These teeth are designed to engage the rolled or otherwise formed generally C-shaped lip 208 provided on the retainer plate 210 and operate in substantially the same manner as clip 56 to prevent relative rotation of the wheel trim with respect to lock bracket 180 and the associated vehicle wheel. Lip 208 may also be provided with suitable ribs or undulations to aid in preventing clip 178 from sliding therealong.

Referring now to FIGS. 45 through 49, there is shown another embodiment of an anti-rotation assembly in accordance with the present invention indicated generally at 210 and including a lock bracket 212 to which is fitted a washer element 214. Portions of center hub assembly corresponding to center hub assembly 14 are indicated by like numbers primed.

Figure 46:
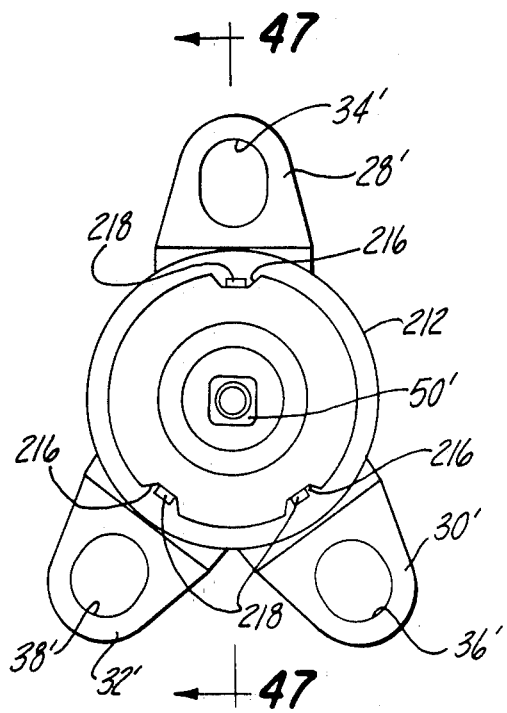
FIG. 46 is a view of the lock bracket shown in FIG. 45 as seen looking axially inwardly.
Figure 47:
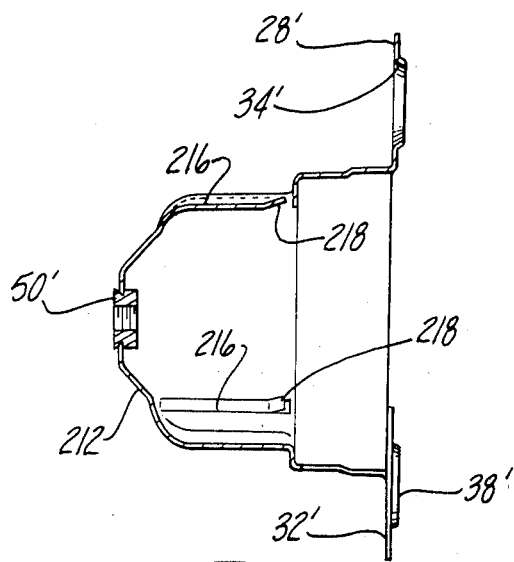
FIG. 47 is a section view of the lock bracket of FIG. 46, the section being taken along line 47—47 thereof.
Figure 48:
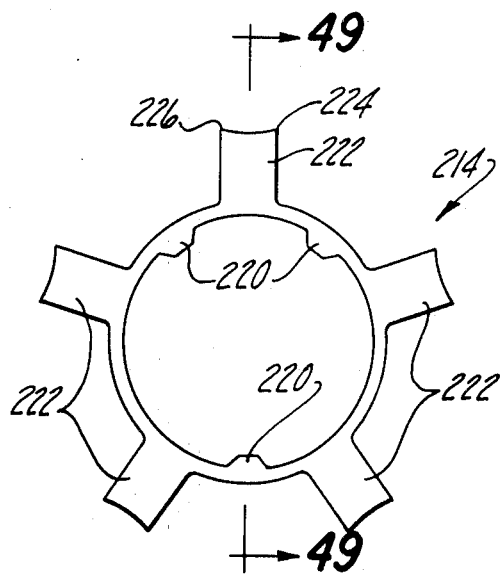
FIG. 48 is a plan view of the anti-rotation washer element shown in FIG. 45.
Figure 49:
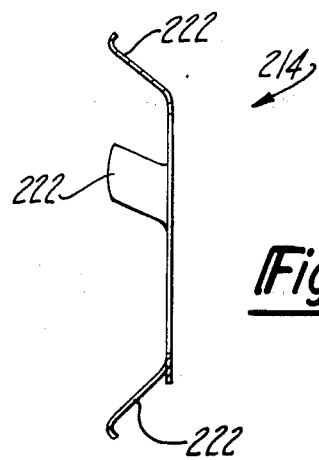
FIG. 49 is a section view of the washer element of FIG. 48, the section being taken along line 49—49 thereof.
Figure 53:
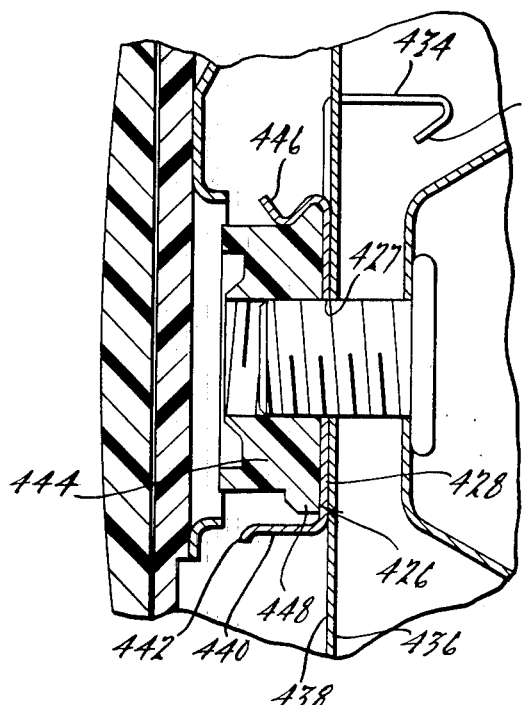
FIG. 53 is a view similar to that of FIG. 50 but showing yet another embodiment of a center fastener retention means in accordance with the present invention.
Figure 54:
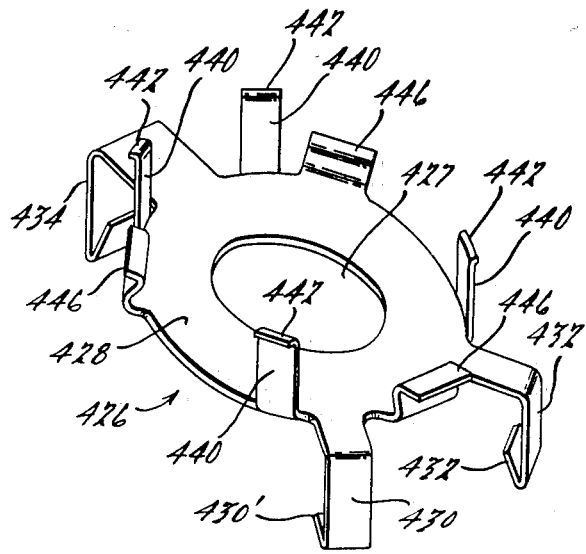
FIG. 54 is a perspective view of the clip shown in FIG. 53.
Figure 55:
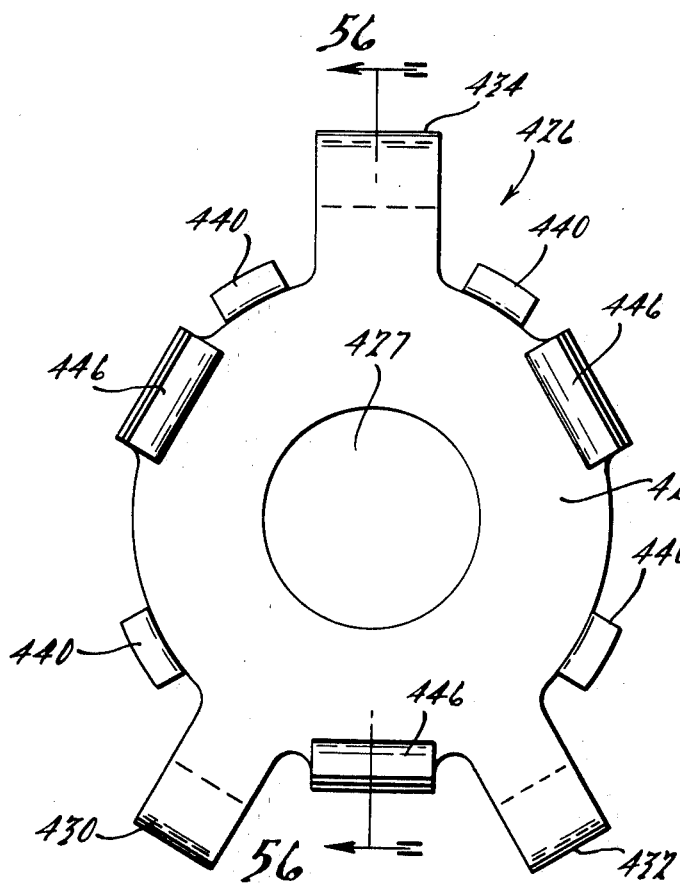
FIG. 55 is a plan view of the clip shown in FIG. 54.
Figure 56:
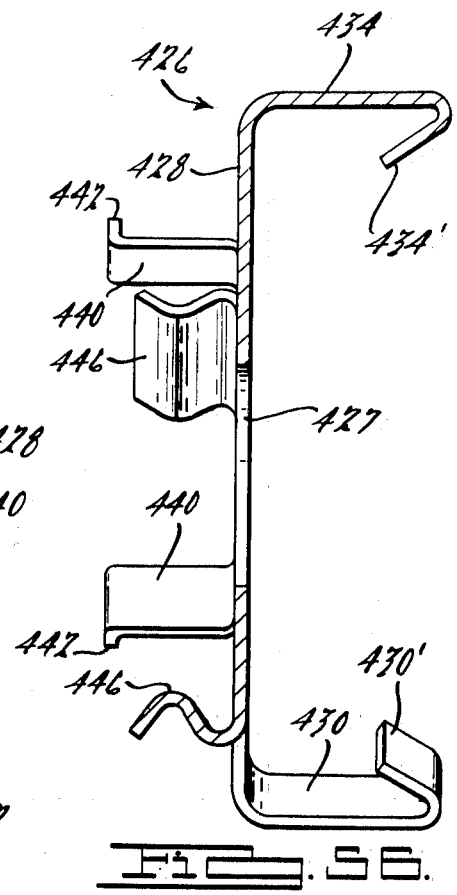
FIG. 56 is a section view of the clip shown in FIG. 55, the section being taken along line 55—55 thereof.

As best seen with reference to FIGS. 46 and 47, lock bracket 212 has a plurality of axially extending grooves 216 provided on the sidewalls thereof each of which has a radially outwardly projecting tab portion 218 (preferably formed by lancing) at the axially inner end thereof. The remaining portions of lock bracket 212 are substantially identical to those previously described with reference to lock bracket 18 and are indicated by like numerals primed.

Washer element 214 includes a plurality of radially inwardly extending tab portion 220 positioned and sized so as to be received within respective grooves 216 provided on lock bracket 212. Additionally, a plurality of legs 222 project generally radially and axially outwardly from washer element 214 each being provided with a generally arcuate end portion defining a pair of teeth 224, 226. Teeth 224, 226 are adapted to bitingly engage a generally axially inwardly extending flange portion 228 of a ring member 230 secured to the inner side of the center hub assembly. Preferably legs 222 will be angulated such as to engage axial flange 232 of ring 230 before lock bolt 54' is fully tightened. Thus, as lock bolt 54' is tightened down, flange 232 will bias legs 222 radially outwardly into biting engagement with flange portion 228 thereby substantially precluding relative rotation of the wheel trim with respect to washer element 214. Because of the interlocking tabs 220 and grooves 216, relative rotation between washer element 214 and lock bracket 212 is effectively precluded whereby relative rotation of the wheel trim with respect to the lock bracket and hence the vehicle wheel is effectively precluded. When washer element 214 is assembled to lock bracket 212, tabs 220 will deflect tabs 218 on lock bracket 212 inwardly as they are slid past whereupon tabs 218 will snap radially outwardly thereby providing a mechanical interlock to retain washer element 214 on lock bracket 212.

Referring now to FIGS. 50 through 52, there is shown another embodiment of a center fastener retention clip being indicated generally at 400. Clip 400 is generally rectangular in shape and includes a central body portion 402 and a pair of leg members 404 and 406 integrally formed at opposite peripheral edges thereof which are received in suitably positioned slotted openings provided in the central portion of a retainer plate 408. Retainer plate 408 will be similar in terms of construction, function and assembly to retainer plate 84 shown in FIG. 1 hereof and forms a part of a suitable wheel trim member such as for example simulated wire wheel trim member 10 shown in FIG. 1.

Each of the leg members 404 and 406 have a return portion extending generally axially outwardly which is designed to engage the inner surface of retainer plate 408 so as to retain clip 400 in assembled relationship therewith.

A central opening 410 is provided in central body portion 402 which is designed to be positioned in coaxial relationship with the opening in retainer plate 408. A pair of axially outwardly extending arm members 412 and 414 are also struck from central body portion being positioned on diametric opposite sides of opening 410. Each of the arms 412 and 414 is substantially identical and includes an arcuate shaped portion 416, 418 adjacent the terminal end thereof which bows radially inwardly. As best seen in FIG. 50, arcuate portions 416, 418 are adapted to overlie an annular flange portion 420 provided on a suitable center fastener 422 and to engage sidewall surface 424 thereof. Sidewall surfaces 424 may have means provided thereon to enhance the gripping engagement of arms 412, 414 therewith such as for example diametrically opposed flats, whereby arms 412 and 414 may operate to both retain same and to prevent free relative rotation thereof due to vibration or the like. In order to install or remove center fastener 422 from engagement with a lock bracket, a suitable socket type wrench may be applied telescopically to the head of fastener 422 and slide over sidewalls 424 so as to flex arms generally radially outwardly. It should also be noted that because arms 412 and 414 are radially flexible, it is possible to assemble a center fastener to a fully assembled wheel trim. This is particularly advantageous when coded center fasteners such as disclosed in related copending application Ser. No. 347,683 entitled "Wheel Trim Center Retention System" filed Feb. 11, 1982 are used as the center fasteners and wheel trim may be separately stocked and easily assembled as needed.

While center fastener retainer 400 described above is particularly well suited for use with lock bolts including an axially extending threaded shank, another embodiment 426 is shown and will be described with reference to FIGS. 53-56 which may be used with lock bolts but is particularly adapted for lock nuts which are adapted to mate with a threaded stud projecting outwardly from an associated lock bracket affixed to the vehicle wheel.

Center fastener retainer 426 is similar to lock bolt retainer 400 and includes a generally circular main body portion 428 having a central opening 427 and from which three circumferentially spaced legs 430, 432, and 434 extend generally radially outwardly and then axially inwardly as shown. Each of legs 430, 432, and 434 is provided with a return portion 430', 432' and 434' respectively which is designed to engage the axially inner surface 436 of a retainer plate 438 through which legs 430, 432, and 434 extend to retain center fastener retainer 426 in assembled relationship.

A first plurality of substantially identical arms 440 extend generally axially outwardly from circumferentially spaced locations around the periphery and each have a terminal end portion 442 extending generally radially outwardly. The arms are provided to guide installation of the center fasteners such as lock nut 444.

A second plurality of relatively short generally S-shaped arm members 446 extending generally axially outwardly also are provided circumferentially spaced around the periphery of main body portion 428. Arms 446 are designed to overlie a flange portion 448 provided on lock nut 444 so as to retain same in assembled relationship with the wheel trim when it is removed from the vehicle. Additionally, arms 446 will also preferably be designed to grip lock nut 444 sufficiently strongly to inhibit relative rotation thereof due to vibration or the like. The engaged surfaces of lock nut 444 may also be provided with means to enhance this gripping action if desired such as flats, notches or a textured surface. This retainer also allows for installation of the lock nut 444 subsequent to complete assembly of the wheel trim in substantially the same manner described above with reference to center fastener retainer 400.

A further embodiment of a center fastener retainer 450 is shown and will be described with reference to FIGS. 57 through 59. Center fastener retainer 450 is well suited for use with a variety of center fasteners including both lock bolts and lock nuts. In this embodiment a generally rectangular main body portion 452 has a pair of axially inwardly extending leg portions 454, 456 at opposite ends thereof which are adapted to be received within apertures 458, 460 provided in a retainer plate 462. Each of the legs 454, 456 includes a return portion 462, 464 adapted to engage the axially inner surface 466 of retainer plate 462 so as to maintain retainer clip in assembled relationship therewith.

Main body portion 452 also has a central aperture 468 provided therein defined in part by a pair of axially outwardly raised circumferentially extending arcuate flange segments 470 and 472 which are adapted to overlie an annular flange portion 474 of a center fastener 476. A pair of spring arms 478, 480 are integrally formed with retainer 450 being positioned on diametrically opposed sides thereof each being defined by spaced generally parallel radially outwardly extending slots. Arms 478 and 480 each have a slightly axially outwardly extending terminal end portion 482, 484 which is adapted to engage a relatively small flat provided on the periphery of flange 474 of center fastener 476 so as to prevent relative rotation thereof. Contrary to the previous embodiments, center fastener 476 must be assembled to the retainer plate before retainer 450 is attached thereto as it is not possible to install it after assembly due to the overlying relationship of flanges 470, 472 with respect to flange 474. This arrangement is particularly well suited to situations wherein a set of four such trim members are sold as a package unit along with the appropriately coded installation tool or alternatively if uncoded center fasteners are used.

It should be noted that the respect to both embodiments of anti-rotation clips and the anti-rotation washer element, the relative angular positioning of the wheel trim with respect to the lock bracket is substantially infinitely variable thereby assuring that the wheel trim may be easily positioned to accommodate the valve stem projecting outwardly from the vehicle wheel. As previously mentioned, this variable positioning is important because valve holes in wheels may be located over a relatively broad range of angular positions.

Further, as previously mentioned, the lock bolt retainer assembly also operates to insure that the lock bolt will not loosen during operation of the vehicle such as may result from vibration or the like encountered by the vehicle wheel. Additionally, should the operator of the vehicle fail to securely or fully tighten the lock bolt, the retainer assembly will nevertheless inhibit further loosening thereof.

The present invention thus provides a center retention system for vehicle wheel trim which not only accommodates the valve stem regardless where the hole may be positioned on the wheel but also effectively inhibits relative rotation of the trim member and/or lock bolt with respect to the wheel. Additionally, the peripheral centering spring clips aid in facilitating assembly of the wheel trim to the vehicle wheel and alignment of the lock bolt and nut as well as preventing annoying rattle of the wheel trim against the wheel.

While it will be apparent that the preferred embodiments of the invention disclosed are well calculated to provide the advantages and features above stated, it will be appreciated that the invention is susceptable to modification, variation and change without departing from the proper scope or fair meaning of the subjoined claims.

I claim:

1. A wheel trim assembly for a vehicle wheel, comprising:
    a trim member;
    a lock bracket adapted to be secured to an axially outwardly facing surface of said wheel;
    retention means for detachably securing said trim member to said lock bracket; and
    anti-rotation means for preventing relative rotation between said trim member and said vehicle wheel, said anti-rotation means including first means on said trim member and second means on said lock bracket engageable with said first means to allow said trim member to be initially angularly positioned with respect to said lock bracket in any one of a number of relative angular positions and to thereafter resist relative rotation therebetween, one of said first and second means being operable to move generally radially into non-slipping engagement with the other in response to axial movement of said trim member toward said lock bracket and wheel.

2. A wheel trim assembly as set forth in claim 1 wherein said retention means is operable to pull said trim member towards said lock bracket and wheel to effect said axial movement.

3. A wheel trim assembly as set forth in claim 1 wherein said lock bracket comprises the sole means for securing said wheel trim to said wheel.

4. A wheel trim assembly as set forth in claim 1 wherein said anti-rotation means is operative to allow infinite initial angular positioning of said wheel trim with respect to said vehicle wheel.

5. A wheel trim assembly as set forth in claim 1 wherein one of said first means and said second means of said anti-rotation means includes a generally radially extending surface.

6. A wheel trim assembly as set forth in claim 1 wherein said anti-rotation means comprise a plurality of clips secured in circumferentially spaced relationship to said lock bracket.

7. A wheel trim assembly as set forth in claim 1 wherein said second means of said anti-rotation means comprise an annular washer member having means securing said washer member to said lock bracket.

8. A wheel trim assembly as set forth in claim 7 wherein said one of said first and second means comprise a plurality of generally radially outwardly extending circumferentially spaced arms provided on said washer member.

9. A wheel trim assembly as set forth in claim 8 further comprising means for preventing relative rotation between said washer member and said lock bracket.

10. A wheel trim assembly as set forth in claim 9 wherein said washer anti-rotation means comprise a plurality of circumferentially spaced grooves on said lock bracket and cooperating tab portions on said washer member receivable in said grooves.

11. A wheel trim assembly as set forth in claim 7 wherein said securing means comprise an annular shoulder engageable with one side of said washer member and locking means engageable with the other side.

12. A wheel trim assemble as set forth in claim 11 wherein said locking means comprise a deflectable tab portion on said lock bracket engageable with the axially outer surface of said washer member.

13. A wheel trim assembly as set forth in claim 1 wherein said retention means comprise first and second rotatably connectable elements, said first element being provided on said lock bracket, and retainer means secured to said trim member and engageable with said second element to retain said second element in assembled relationship with said trim member.

14. A wheel trim assembly as set forth in claim 13 wherein said retainer means releasably engages said second element.

15. A wheel trim assembly as set forth in claim 13 wherein said retainer means includes an arm member releasably engageable with said second element and operative to inhibit relative rotation of said second element with respect to said trim member.

16. A wheel trim assembly as set forth in claim 15 wherein said arm member further operates to releasably retain said second element.

17. A wheel trim assembly as set forth in claim 16 wherein said retainer means further includes a plurality of axially outwardly extending guide members operative to guide assembly of said second element.

18. A wheel trim assembly for a vehicle wheel, comprising:
a trim member;
a lock bracket adapted to be secured to an axially outwardly facing surface of said wheel;
retention means for detachably securing said trim member to said lock bracket; and
anti-rotation means for preventing relative rotation between said trim member and said vehicle wheel, said anti-rotation means including first means on said trim member and second means on said lock bracket engageable with said first means to allow said trim member to be initially angularly positioned with respect to said lock bracket in any one of a number of relative angular positions and to thereafter resist relative rotation therebetween, one of said first and second means having a plurality of generally radially extending members having teeth provided on the terminal ends thereof and being operable to move generally radially into non-slipping biting engagement with the other of said first and second means in response to axial movement of said trim member toward said lock bracket and wheel.

19. A wheel trim assembly as set forth in claim 18 wherein said members are secured to said lock bracket and positioned so as to avoid interference with access to wheel securing means.

20. A wheel trim assembly as set forth in claim 18 wherein said other of said first and second means comprises a retainer plate secured to said wheel trim having an annular lip provided thereon.

21. A wheel trim assembly as set forth in claim 20 wherein said lip is provided with undulations operative to aid said members in inhibiting relative rotation between said wheel trim and said lock bracket.

22. A wheel trim assembly for a vehicle wheel, comprising:
a trim member;
a lock bracket adapted to be secured to an axially outwardly facing surface of said wheel;
retention means for detachably securing said trim member to said lock bracket; and
anti-rotation means for preventing relative rotation between said trim member and said vehicle wheel, said anti-rotation means including first means on said trim member and second means on said lock bracket engageable with said first means to allow said trim member to be initially angularly positioned with respect to said lock bracket in any one of a number of relative angular positions and to thereafter resist relative rotation therebetween, one of said first and second means being operable to move generally radially into non-slipping engagement with the other in response to axial movement of said trim member toward said lock bracket and wheel, said anti-rotation means including a plurality of clips and a first slot provided in said lock bracket for each of said clips, each of said clips including a tab received in said slot, said tab including a portion engageable with an inner surface of said lock bracket to mechanically lock said clip on said lock bracket.

23. A wheel trim assembly as set forth in claim 22 wherein said lock bracket further includes a second slot positioned axially outwardly from said first slot for receiving an end portion of each of said clips.

24. A wheel trim assembly as set forth in claim 23 wherein each of said clips has a body portion provided with a contour substantially conforming to the contour of the portion of said lock bracket engaged by said body portion so as to resist relative canting of said clips with respect to said lock bracket.

25. A wheel trim assembly as set forth in claim 24 wherein said engaged portion of said lock bracket is a substantially flat axially extending portion and said lock bracket further includes a radially extending flat adjacent the axially outer end of said axially extending flat, said radial flat cooperating with an offset portion of said clip to resist relative axial movement of said clip with respect to said lock bracket during assembly of said wheel trim to said lock bracket.

26. A wheel trim assembly for a vehicle wheel which is secured to the vehicle by a plurality of lug nut or lug bolt fasteners each having a wheel engaging first shoulder thereon, said trim assembly comprising:
a trim member;
a lock bracket adapted to be secured to an axially outer surface of said wheel, said lock bracket having a plurality of generally radially outwardly extending legs each having an opening therethrough for receiving one of said fasteners, said lock bracket being adapted to be retained on said wheel by means of a second shoulder on said fastener disposed axially outwardly from said first shoulder;

retention means for detachably securing said wheel trim to said lock bracket; and positioning means comprising a deformable member formed on each said leg adjacent the opening therethrough and projecting generally axially inwardly therefrom, said deformable member being pinched between said wheel and said lock bracket to rigidly position said lock bracket with respect to said wheel.

27. A wheel trim assembly as set forth in claim 26 wherein said positioning means comprises at least one tab integrally formed on each said leg.

28. A wheel trim assembly as set forth in claim 26 wherein said deformable member is deformed by the axial movement of said second shoulder toward said wheel and operative to maintain said lock bracket in secure engagement with said second shoulder whereby said lock bracket is rigidly maintained in position with respect to said wheel.

29. A wheel trim assembly for a vehicle wheel, comprising:

a trim member;

a lock bracket adapted to be secured to a vehicle in an axially outwardly facing relationship with respect to said wheel;

rotatably connectable first and second retention elements for securing said wheel trim to said lock bracket, said first element being associated with said lock bracket and said second element being associated with said wheel trim; and spring biased rotation inhibiting means attached to one of said trim member and said lock bracket and yieldably engageable with and operable between said second element and either of said trim or said lock bracket to directly inhibit relative rotation of said first and second elements in order to reduce the possibility of undesired separation of said first and second elements.

30. A wheel trim assembly as set forth in claim 29 further comprising a torque tool engageable with said second element to effect relative rotation thereof with respect to said first element to secure said wheel trim to said lock bracket.

31. A wheel trim assembly as set forth in claim 30 wherein said torque tool includes means for disabling said rotation inhibiting means when said tool is engaged with said second element.

32. A wheel trim assembly as set forth in claim 29 wherein said rotation inhibiting means is attached to one of said lock bracket and said wheel trim.

33. A wheel trim assembly as set forth in claim 26 wherein said rotation inhibiting means comprise a clip member attached to said lock bracket and engageable with said second element upon connection of said first and second elements.

34. A wheel trim assembly as set forth in claim 33 wherein said clip engages said second element after connection of said first and second elements.

35. A wheel trim assembly as set forth in claim 33 wherein said second rotatable element has a flat provided thereon, said clip being engageable with said flat to inhibit relative rotation of said second element with respect to said first element.

36. A wheel trim assembly as set forth in claim 33 wherein said clip comprises a spring wire attached to said lock bracket and having a portion overlying a portion of an opening in said first element receiving said second element.

37. A wheel trim assembly for a vehicle wheel, comprising:

a trim member;

a lock bracket adapted to be secured to an axially outer surface of said wheel;

rotatably connectable first and second retention elements for securing said wheel trim to said lock bracket, said first element being associated with said lock bracket and said second element being associated with said wheel trim; and rotation inhibiting means operable between said second element and one of said trim member and said lock bracket to inhibit relative rotation of said first and second elements in order to reduce the possibility of undesired separation of said first and second elements, said rotation inhibiting means including a first ring member having a spring arm engageable with a notched periphery of said second element to resist relative rotation between said first and second elements.

38. A wheel trim assembly as set forth in claim 37 wherein said rotation inhibiting means further comprises a second ring member having a leg engageable with an undulating surface portion of said lock bracket, said first and second ring members including overlapping interengaging flange portions operative to prevent relative rotation therebetween.

39. A wheel trim assembly as set forth in claim 38 wherein one of said flange portions includes means for creating a biting engagement with a portion of the other flange portion.

40. A wheel trim assembly as set forth in claim 38 wherein one of said flange portions has a cutout portion for receiving a tab formed on the other flange portion.

41. A wheel trim assembly as set forth in claim 38 wherein said spring arm is movable out of engagement with said second element in response to application of a torque tool to said second element for rotating same.

42. A wheel trim assembly as set forth in claim 38 wherein said first and second ring members are attached to and engage opposite sides of a retainer plate secured to said wheel trim.

43. A wheel trim assembly for vehicle wheels comprising:

a trim member;

a lock bracket adapted to be secured to an axially outwardly facing surface of said wheel;

rotatably connectable first and second retention means for detachably securing said wheel trim to said lock bracket, said first retention means being secured to said lock bracket and said second retention means being associated with said wheel trim;

primary anti-rotation means for preventing relative rotation between said trim member and said lock bracket, said primary anti-rotation means including means secured to one of said wheel trim and said lock bracket and having a first portion engageable with the other of said wheel trim and lock bracket operative to urge a second portion of said primary anti-rotation means into relative rotation inhibiting engagement with said other of said wheel trim and lock bracket in response to axial movement of said wheel trim toward said lock bracket; and secondary anti-rotation means operable between said second retention means and one of said trim member and said lock bracket upon connection of said first and second retention means to inhibit relative rotation between said second retention means and said lock bracket, said primary and secondary anti-rotation means cooperating to resist undesired separation of said wheel trim from said lock bracket.

44. A wheel trim assembly as set forth in claim 43 further comprising positioning means secured to the periphery of said wheel trim engageable with said wheel to aid in radially locating said trim with respect to said wheel upon assembly thereof.

45. A wheel trim assembly for a vehicle wheel, comprising:

a trim member;

a lock bracket adapted to be secured to a vehicle in an axially outwardly facing relationship with respect to said wheel;

rotatably connectable first and second retention elements for securing said wheel trim to said lock bracket, said first element being associated with said lock bracket and said second element being associated with said wheel trim; and retainer means attached to said wheel trim including arm means engaged with said second element and operative to both retain said second element in assembled relationship with said wheel trim and to inhibit relative rotation of said second element with respect to said trim member.

46. A wheel trim assembly as set forth in claim 45 wherein said arm means releasably engage said second element whereby said second element may be installed after assembly of said wheel trim.

47. A wheel trim assembly as set forth in claim 46 wherein said first element comprises an axially outwardly extending stud, said second element comprises a lock nut adapted to receive said stud and said arm means comprise a plurality of generally axially outwardly extending members circumferentially spaced so as to resist radial displacement of said lock nut.

* * * * *